Nov. 20, 1934. J. P. BENOIT 1,981,642
APPARATUS FOR HANDLING BOTTLES AND JARS
Filed Aug. 17, 1933 13 Sheets-Sheet 3

Inventor
Joseph P. Benoit
By J. F. Rule
Attorney

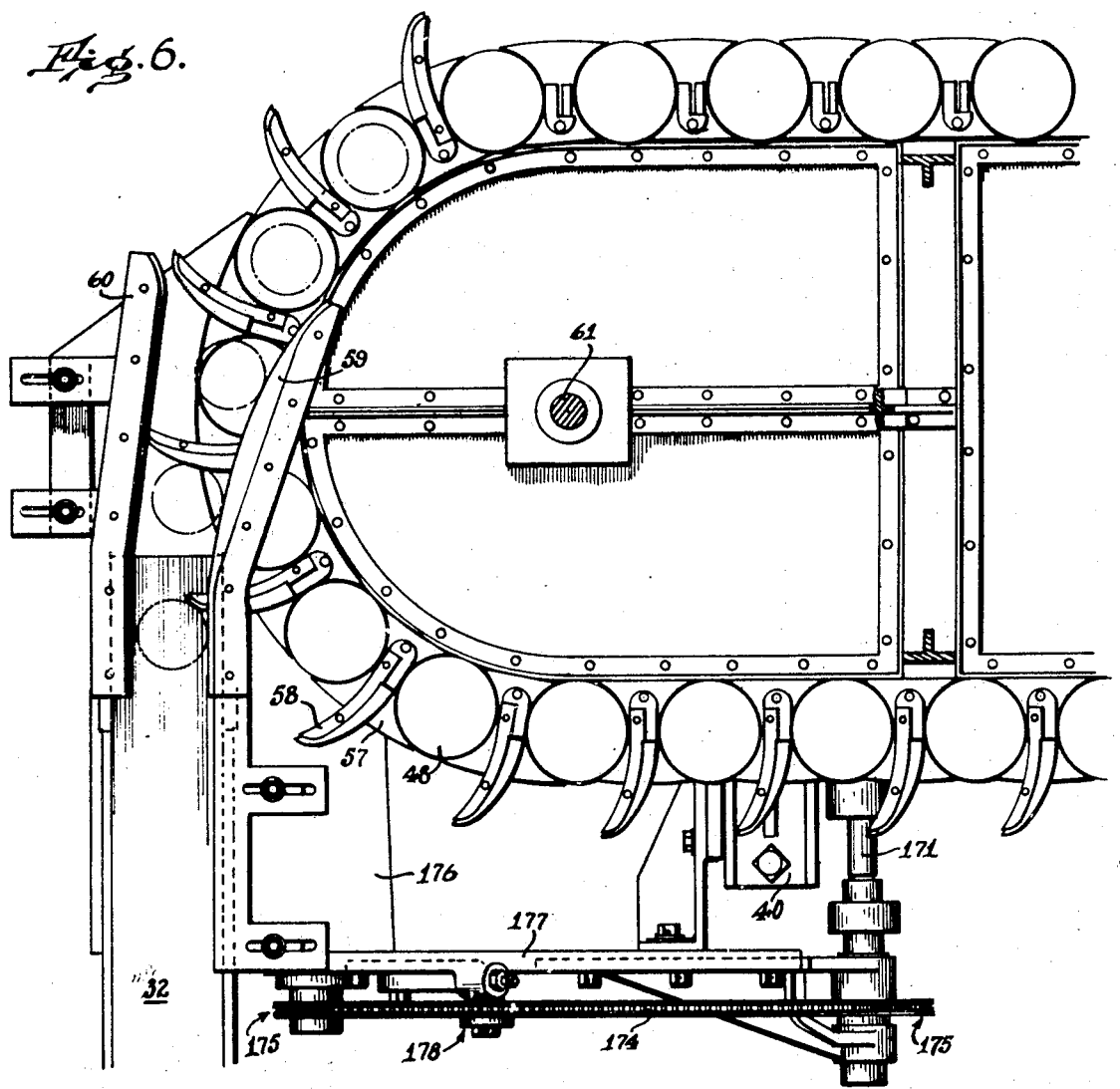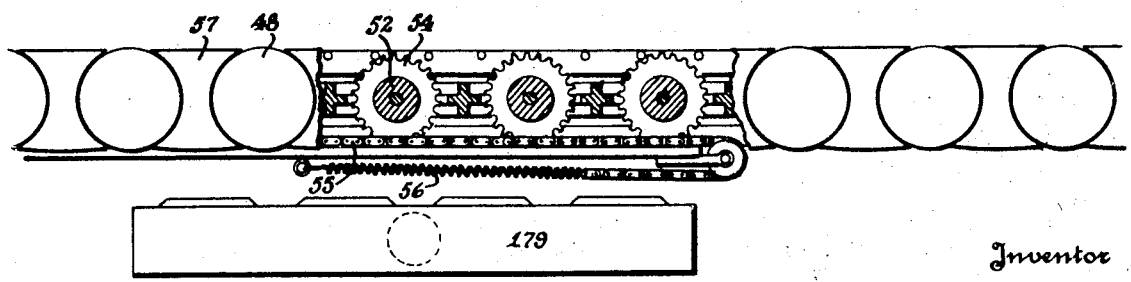

Nov. 20, 1934.  J. P. BENOIT  1,981,642
APPARATUS FOR HANDLING BOTTLES AND JARS
Filed Aug. 17, 1933  13 Sheets-Sheet 7
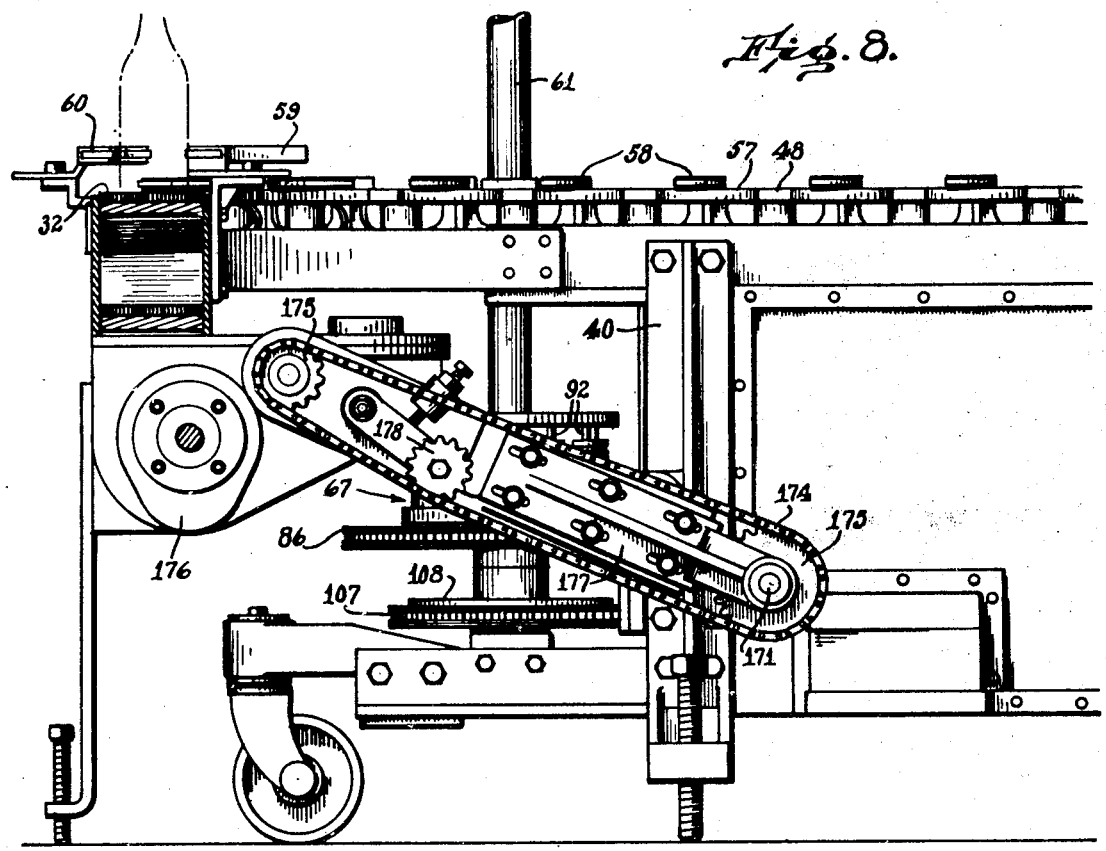
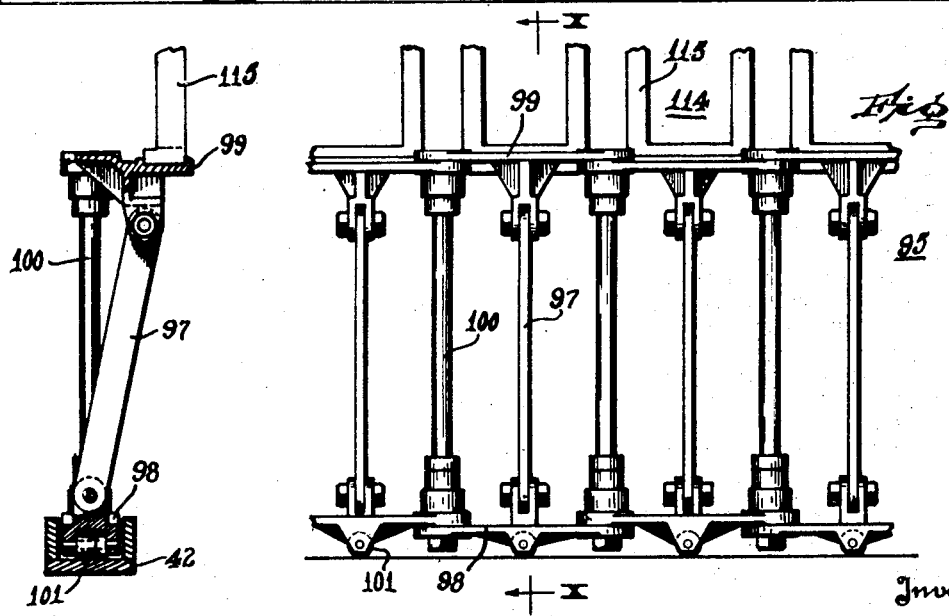
Inventor
Joseph P. Benoit
By J. F. Rule
Attorney Nov. 20, 1934.  J. P. BENOIT  1,981,642
APPARATUS FOR HANDLING BOTTLES AND JARS
Filed Aug. 17, 1933  13 Sheets-Sheet 8
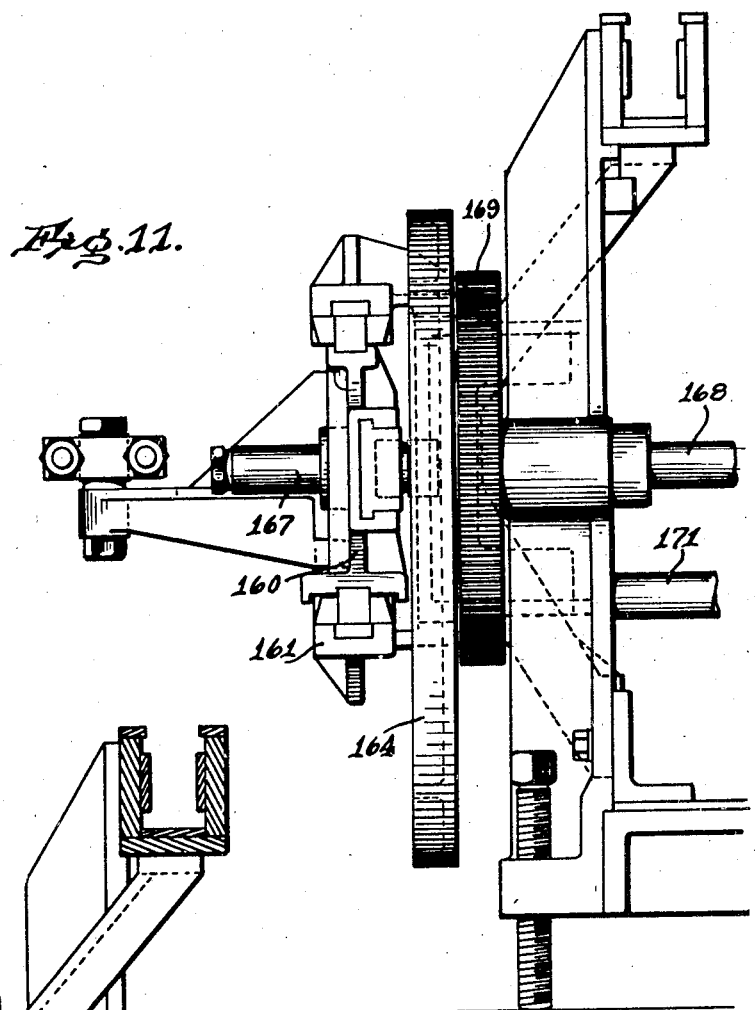
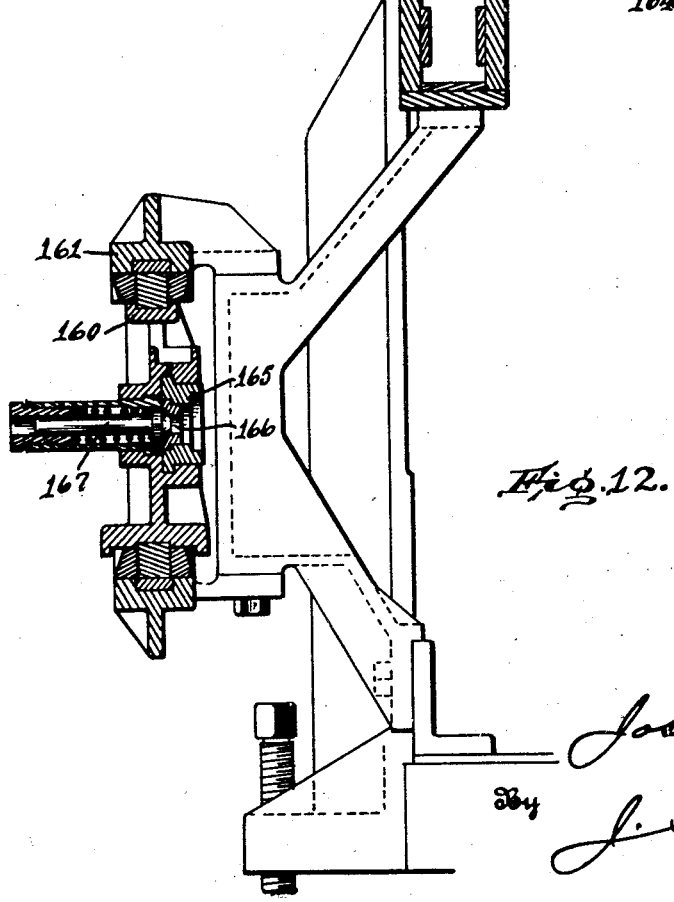
Inventor
Joseph P. Benoit
By J. F. Rule
Attorney

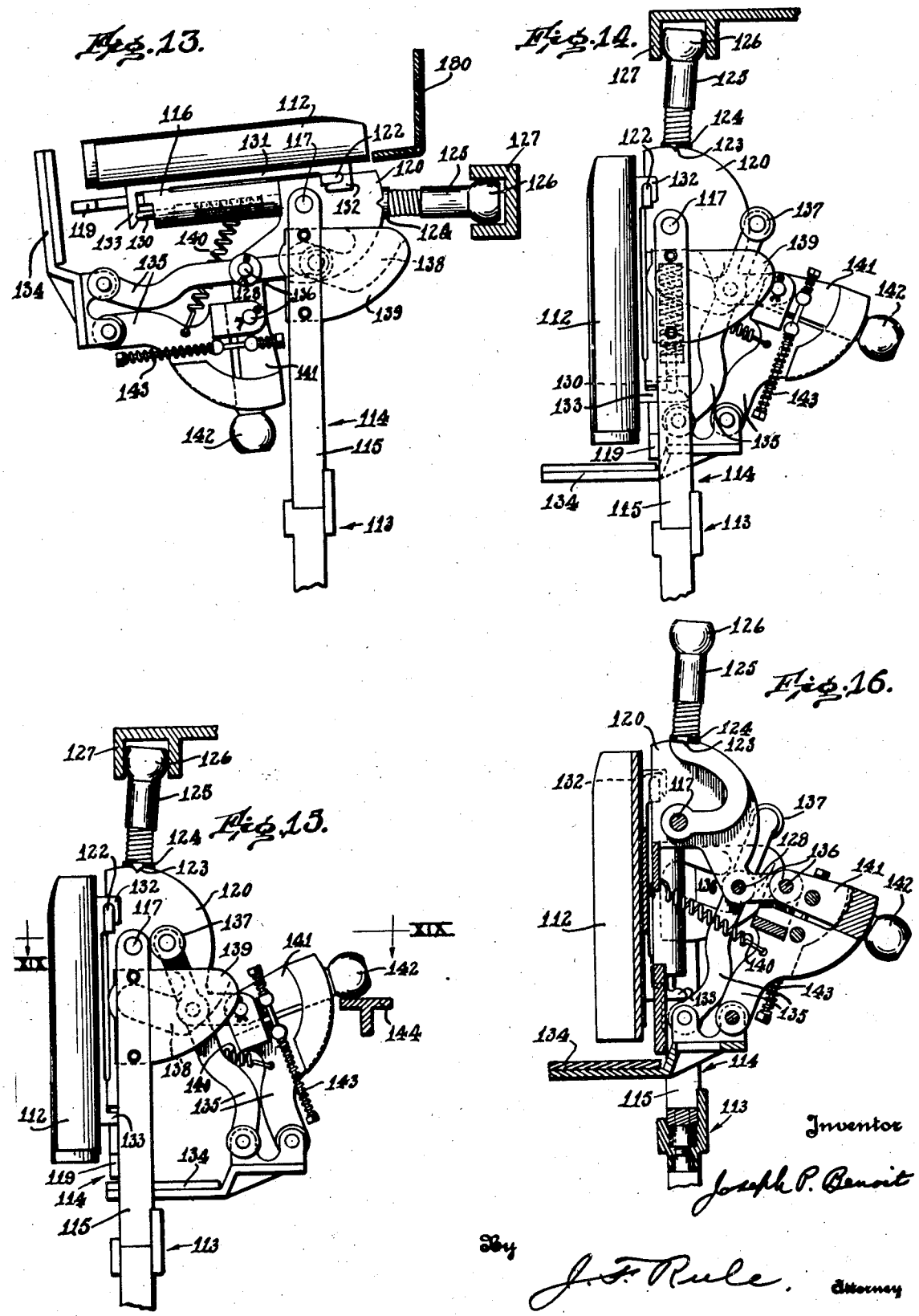

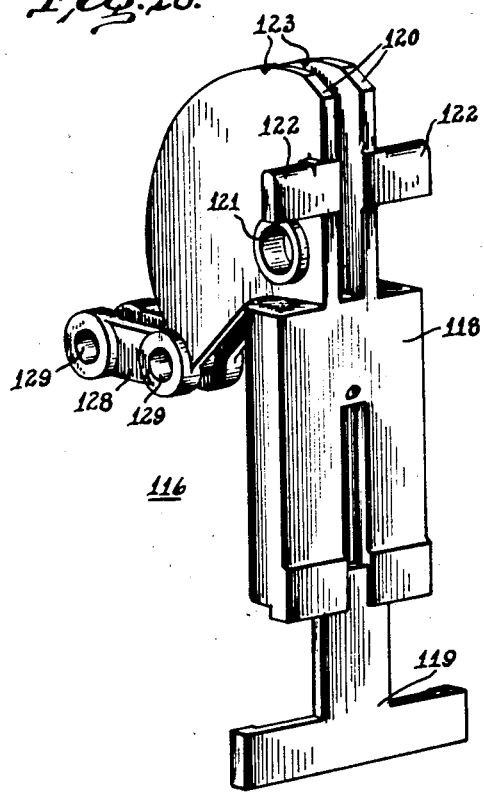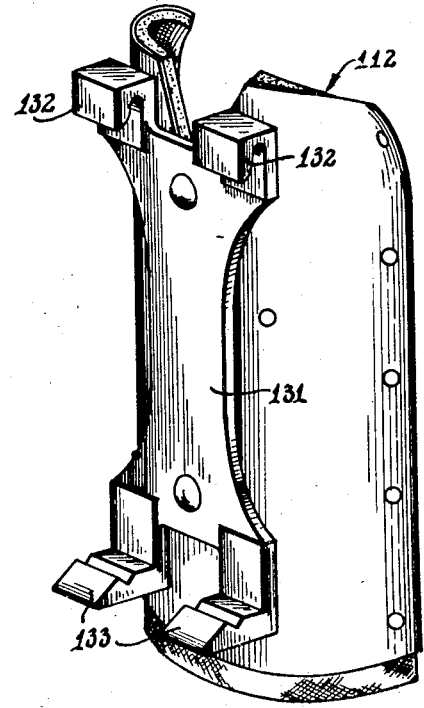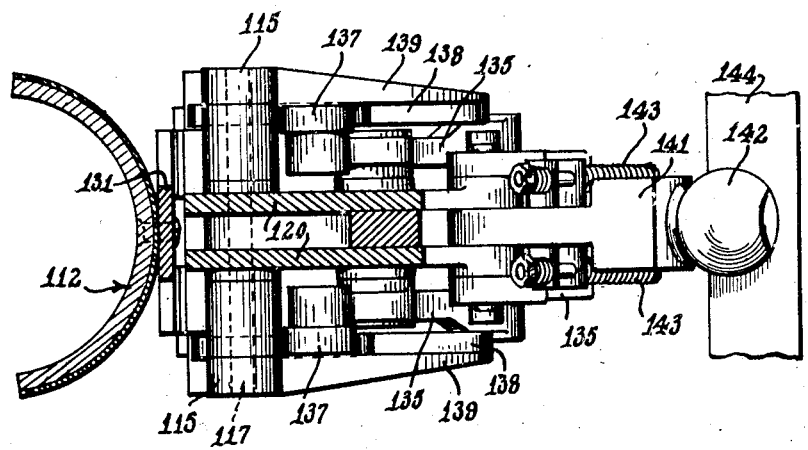

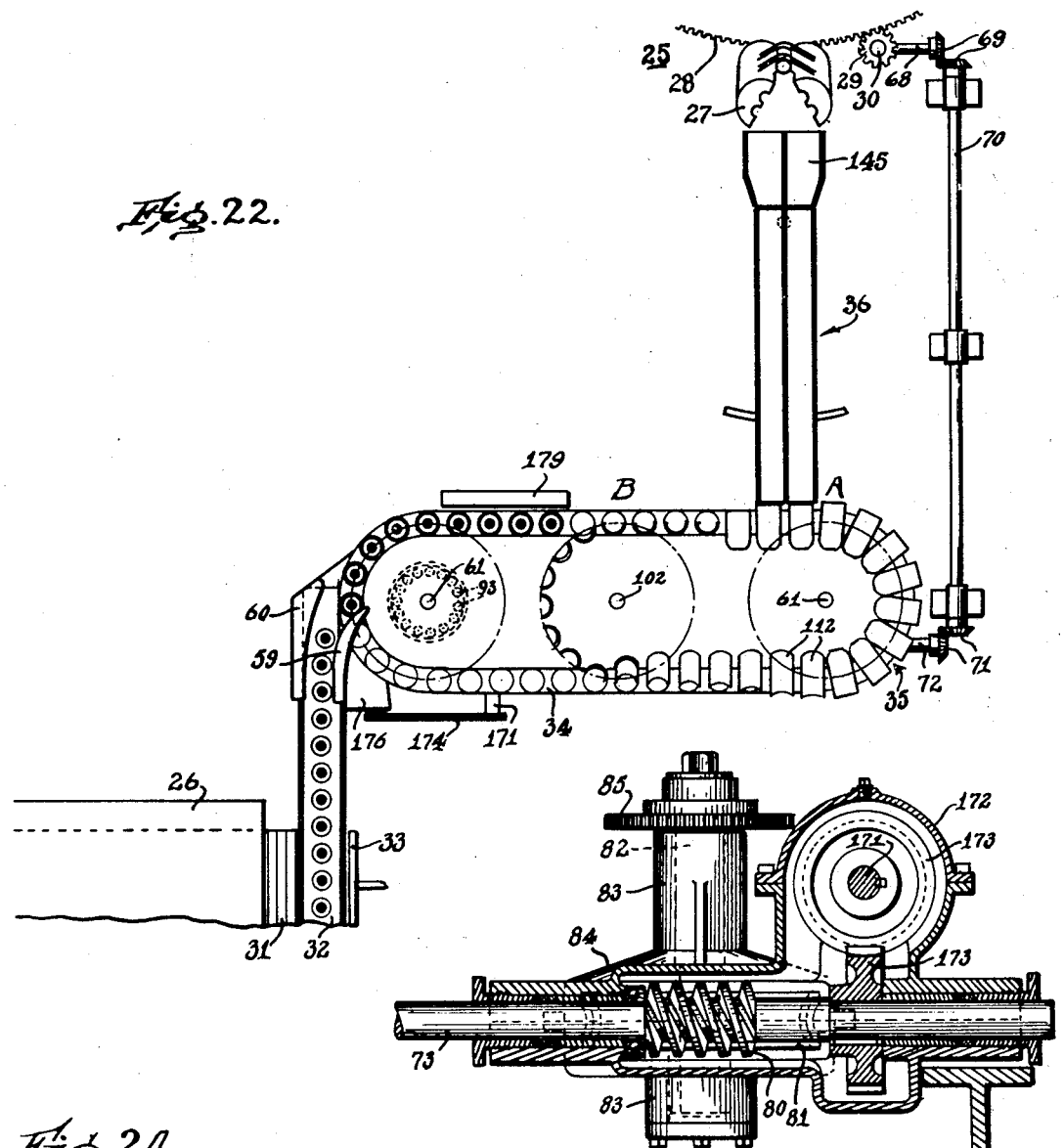
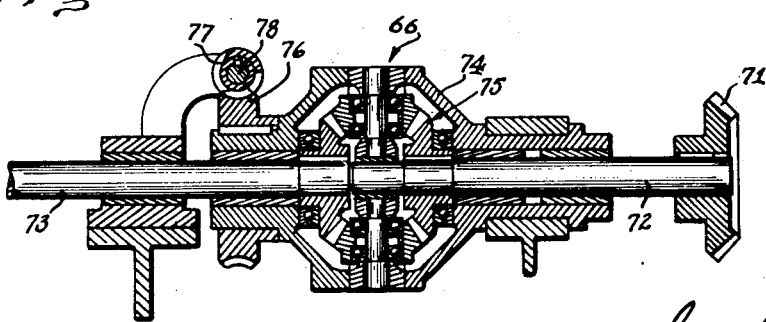

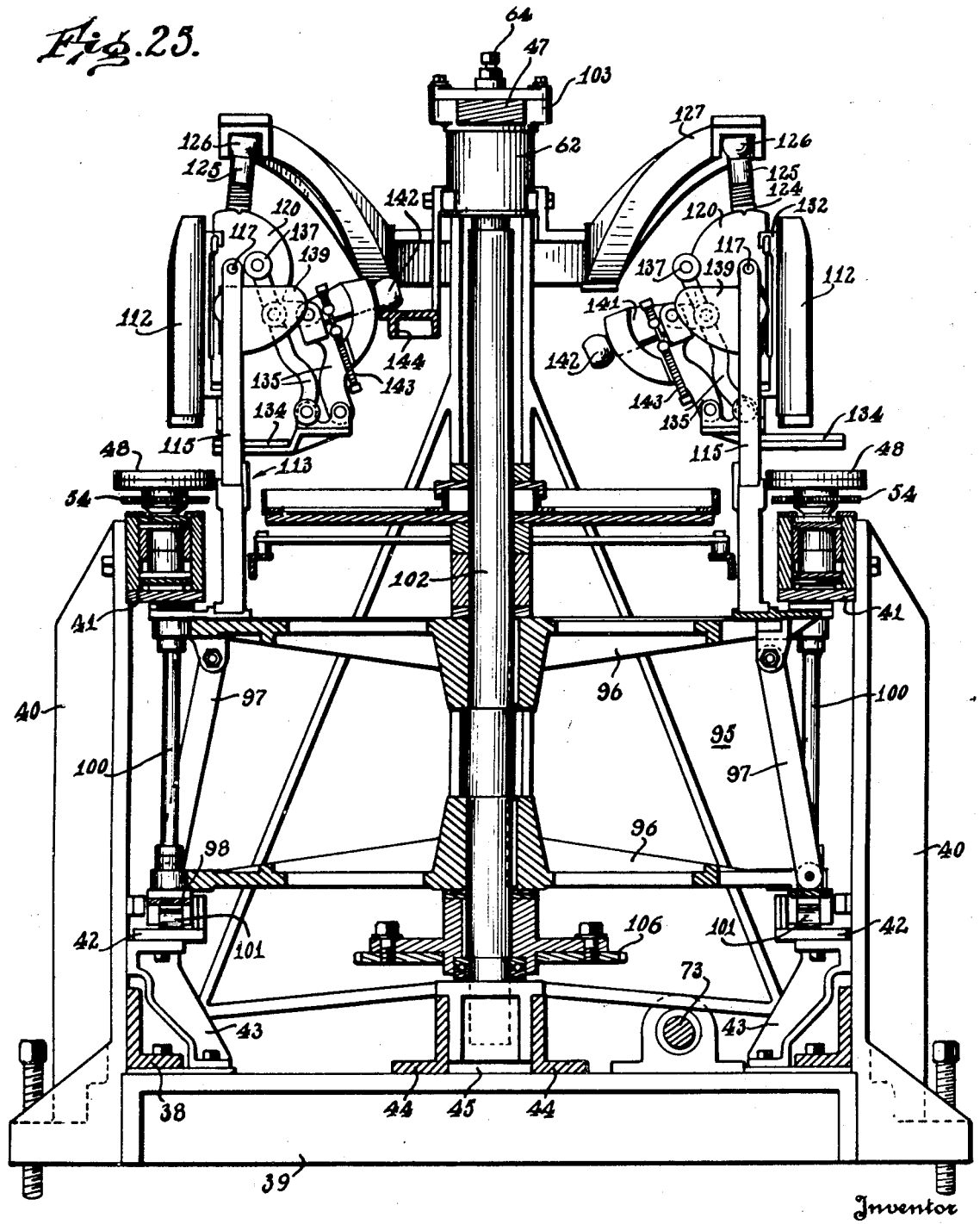

Patented Nov. 20, 1934

1,981,642

UNITED STATES PATENT OFFICE 1,981,642

APPARATUS FOR HANDLING BOTTLES AND JARS

Joseph P. Benoit, Alton, Ill., assignor to Owens-Illinois Glass Company, a corporation of Ohio Application August 17, 1933, Serial No. 685,615

17 Claims. (Cl. 198—27)

The present invention relates to improvements in apparatus for transferring bottles and jars from a blowing machine to the annealing leer and placing them upright in the latter.

In the commercial production of articles of glassware such for example as bottles and jars, the forming machine discharges the finished articles neck first into an inclined chute or trough which guides them to a table or other suitable support where they are picked up by an operator who places them upright upon a machine conveyor. This conveyor carries the bottles to a leer loader which may consist of the usual carrying in or cross conveyor extending across the receiving end of the leer and having associated with it a pusher bar. Mechanism operates the pusher bar at regular time intervals to effect sliding of groups of articles from the cross conveyor to a leer conveyor which transports the articles through the leer.

The present invention provides novel means for automatically handling the articles and insuring placing them upright in the leer.

Another object of the invention is the provision of a novel form of cradle by means of which the bottles or jars discharged neck first from the forming machine are placed upright upon a horizontal conveyor.

A further object is the provision of means for rotating the bottles about their individual vertical axes while passing through a given zone and applying cooling air to the articles during such rotation to thereby effect uniform cooling of the entire structure.

Other objects will be in part apparent and in part pointed out hereinafter.

In the drawings:

Fig. 6 is a fragmentary sectional plan view of the delivery end of the apparatus.

Fig. 7 is a fragmentary detail plan view of the conveyor with parts broken away and in section, showing the means for rotating the bottles.

Fig. 8 is a fragmentary side elevational view of the delivery end of the apparatus.

Fig. 9 is a fragmentary side elevational view of a part of the cradle supporting frame.

Fig. 10 is a sectional elevational view taken along the line X—X of Fig. 9.

Fig. 11 is a detail elevational view of the mechanism for oscillating the loading conveyor to which bottles are initially delivered by the forming machine.

Fig. 12 is a sectional elevational view taken substantially along the line XII—XII of Fig. 1.

Fig. 13 is a detail side elevational view of one of the cradles positioned to receive a bottle which has just been discharged from the forming machine.

Fig. 14 shows the cradle in position to support the bottle upright over the main conveyor.

Fig. 15 shows the cradle in its next position in which the bottom support has been removed to permit dropping of the bottle onto the conveyor.

Fig. 16 is a vertical sectional elevational view of one of the cradles.

Fig. 17 is a detail perspective view of the cradle.

Fig. 18 is a detail perspective view of the cradle holder.

Fig. 19 is a sectional view taken along the line XIX—XIX of Fig. 15.

Fig. 22 is a diagrammatic plan view showing the bottle handling apparatus operating with a forming machine and leer.

Fig. 23 is a sectional view taken along the line XXIII—XXIII of Fig. 3.

Fig. 24 is a sectional view taken along the line XXIV—XXIV of Fig. 3.

Fig. 25 is a sectional view taken along the line XXV—XXV of Fig. 4.

Figure 1:
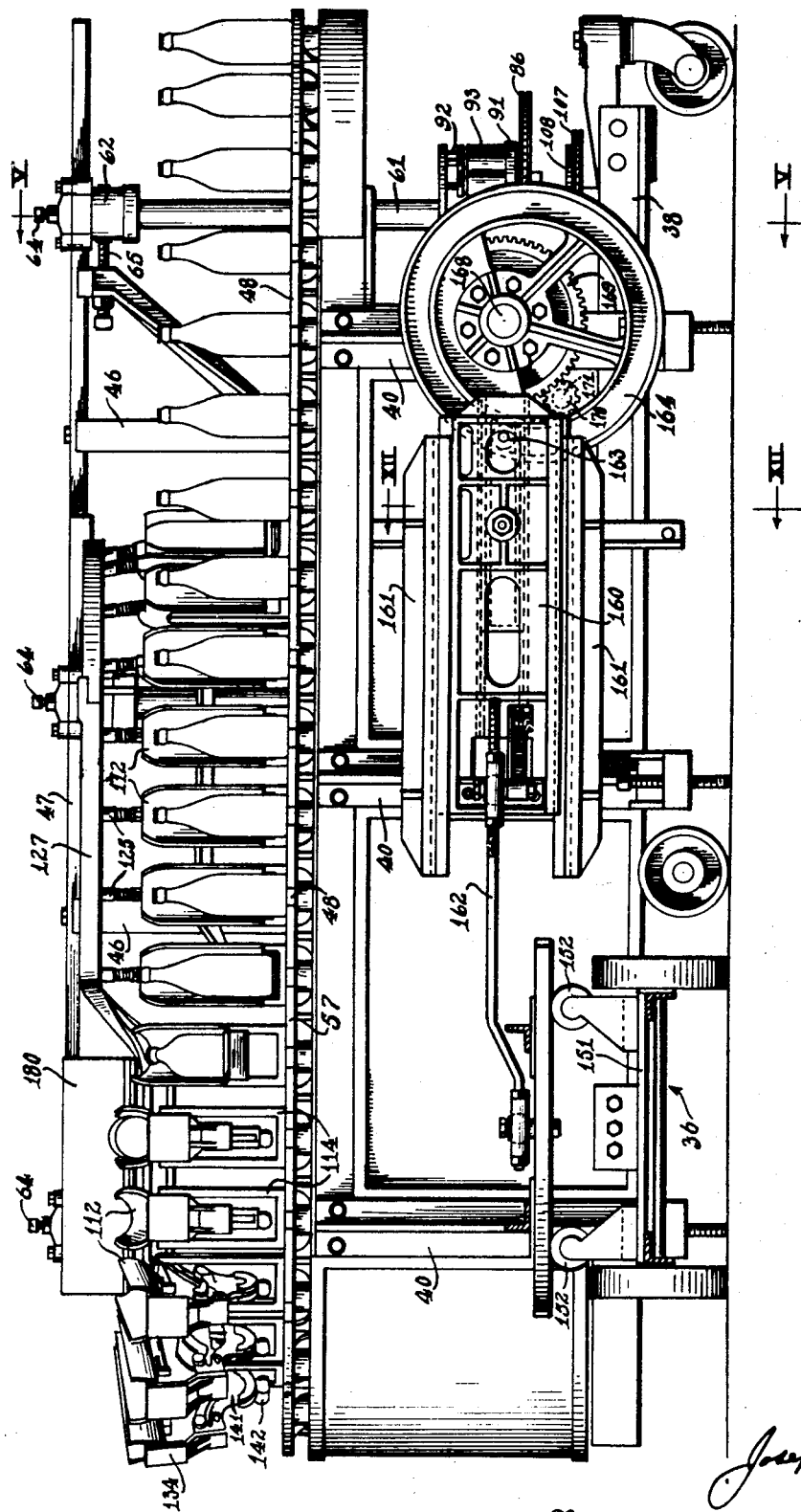
Fig. 1 is a side elevational view.

The invention in more or less general terms consists of a horizontal main conveyor moving continuously in a closed horizontal path between a bottle blowing machine and an annealing leer and automatic means for placing bottles upright upon the main conveyor shortly after they have been discharged from the machine. Broadly this automatic means includes an endless series of uprighting cradles moving continuously in synchronism with the conveyor and in part over the latter, said cradles adapted to have bottles or the like delivered thereto by a loading conveyor and at a discharging position place the bottles or jars upright upon the main conveyor. Bottles are discharged onto the loading conveyor directly from the molds of the forming machine. From the main conveyor the bottles are transferred while upright to a hot belt or carrying-in conveyor by means of which they are placed in front of the receiving opening of an annealing leer.

Accelerated cooling of all or selected portions of the bottles prior to transferring them to the leer may at times be necessary. To accomplish this and in order that such cooling may be uniform, the main conveyor is comprised of a series of rotatable disks upon which the bottles rest and means operable to impart rotary movement to the disks while moving through a cooling zone. Means, such, for example, as a blower, may be arranged at one side of the conveyor for applying low pressure cooling air to the bottles or other articles during their period of rotation.

The illustrated embodiment of the invention (Fig. 22) is shown in conjunction with a bottle blowing machine 25 and an annealing leer 26, both of which may be of conventional or any preferred form. The machine, of which only a fragment is shown, includes a finishing mold 27 and ring gear 28, the latter having driving connection with a pinion 29 at the upper end of a drive shaft 30. The annealing leer 26 includes a horizontal leer conveyor 31 and is equipped with a hot belt or carrying-in conveyor 32, the receiving end of which is disposed at one side of the leer. A leer loader in the form of a pusher bar 33 movable at regular time intervals by means (not shown) transfer the bottles or like articles in groups from the cross conveyor 32 to the leer conveyor 31.

The illustrated form of the invention includes a horizontal main conveyor 34 (frequently referred to as a machine conveyor on account of its relation to the forming machine), a series of uprighting cradles 35 disposed in part over the main conveyor 34, and a loading conveyor 36 which carries the bottles in an orderly fashion from the discharging position of the forming machine to the loading position of said cradles.

Figure 4:
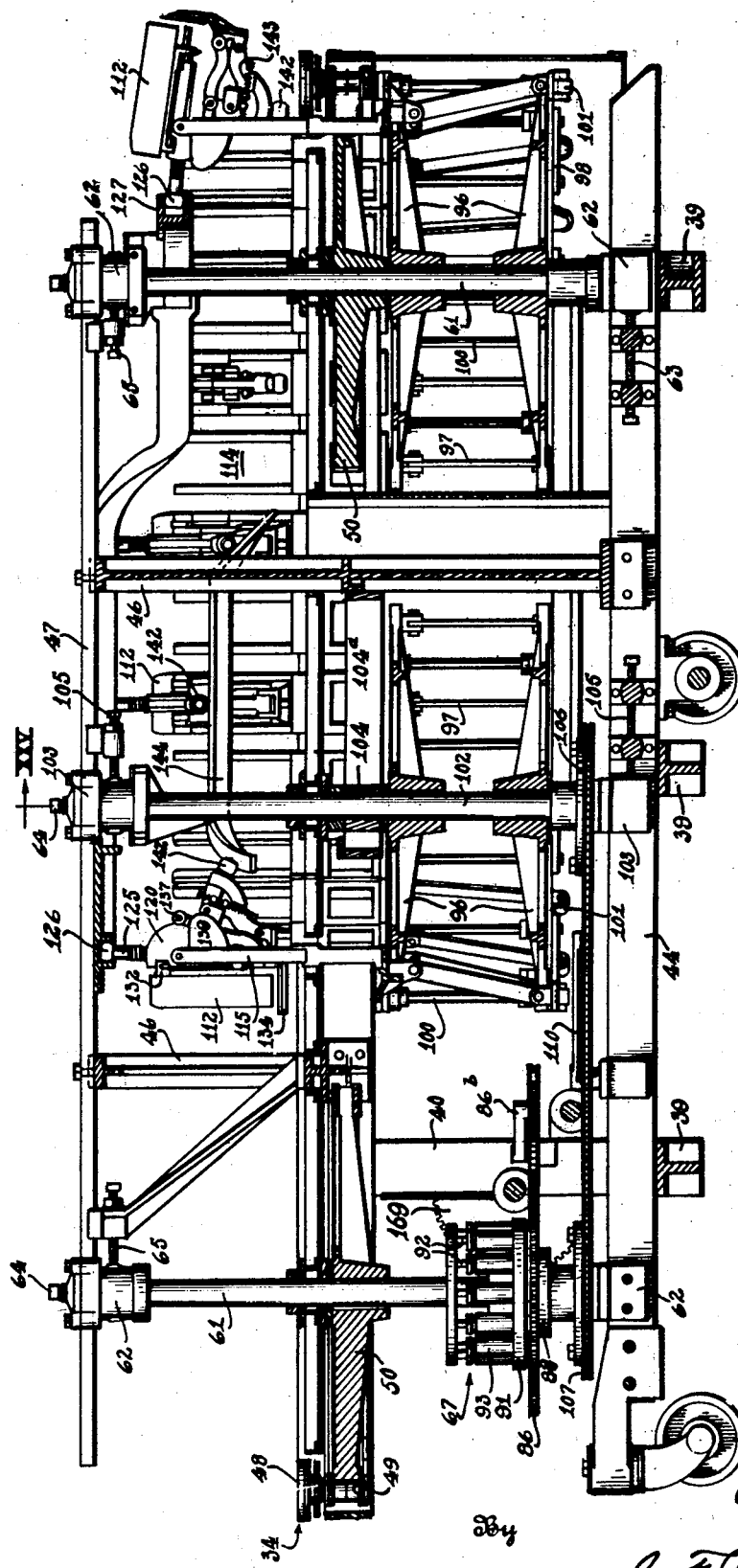
Fig. 4 is a central vertical longitudinal sectional view.

A wheeled frame (Figs. 4, 5, and 25) designed to support the conveyor 34 and cradles 35, consists of a pair of parallel side rails 38 connected together at intervals by cross bars 39. Uprights 40 attached at their lower ends to these side rails 38 and end portions of the cross bars, in part support at their upper ends a pair of sprocket chain guideways 41. A pair of tracks 42 extending lengthwise of the frame below said guideways are supported on brackets 43 just above the cross bars 39. A pair of angle bars 44 spaced apart to form a central longitudinal slideway 45, extend lengthwise of the frame and are suitably secured to the upper side of the cross bars 39. Additional uprights 46 (Fig. 4) spaced inwardly from the ends of the frame and extending above the guideways 41 support at their upper ends a horizontal bar 47 which together with the angle bars 44, adjustably support shaft bearings as will be apparent hereinafter.

The main or machine conveyor 34 consists of a series of rotatable disks 48 supported upon the upper side of a sprocket chain 49 running over a pair of horizontal sprockets 50 which are suitably secured to a pair of vertical shafts 61 disposed at opposite ends of a base frame.

The disks 48 (Fig. 5) in addition to being rotatable are individually removable for convenience of assembly and replacement. Accordingly, each disk is provided with a central vertical shaft 52 depending from its lower side and journaled in a bearing 53 constituting a part of the sprocket chain 49. A small diameter sprocket 54 is secured to the shaft 52 for engagement with a sprocket chain 55 or the like (Fig. 7) in the event accelerated cooling of the bottles supported on the disks is necessary. This sprocket chain may be held in position under tension of a coil spring 56 for obvious reasons.

The sprocket chain 49 in addition to being supported by the sprockets 50 rides on the pair of parallel tracks 41 (Fig. 25) each track assuming the form of an upwardly opening channel. The inner walls of these channels are cut away in proximity to the sprockets 50 so that the bottoms of the tracks may be extended sufficiently to cooperate with the sprockets in supporting the sprocket chain.

Filler plates 57 (Figs. 5 and 6) are arranged between the disks 48 and connected to the sprocket chain 49. Each plate has its opposed margins curved concentric with the axes of rotation of the disks and disposed quite close to the periphery of the latter, thus providing an almost unbroken supporting surface. In order to facilitate removal of bottles or similar articles from the disks curved wiper fingers 58 are separably connected to the filler plates 57 for cooperation with cam fingers 59 disposed at the receiving end of the cross conveyor 32. This cam finger together with an adjustable guide rail 60 and said wiper fingers 58 function to transfer the articles to the cross conveyor 32 by a horizontal sliding movement. The shafts 61 which carry the sprockets 50 are journaled in bearings 62 at the opposite ends of the main supporting frame. The lower pair of bearings 62 are suitably mounted upon the base frame, one being fixed against movement while the other (at the right end of the machine, Fig. 4) is adjustable in the direction of the length of the machine to control the tension of the sprocket chain. Such adjustment of the bearing is provided for by mounting it in the slideway 45 between the pair of angle irons 44. An adjusting screw 63 mounted between the angle bars 44 is operable to change the position of the bearings 62. The upper bearings 62 are slidingly supported on the horizontal bar 47 which extends lengthwise of the machine and constitutes a part of the main supporting frame as stated above. Set screws 64 operate to secure the bearings against premature movement on the bar 47. Adjusting screws 65 contacting the bearings 62 are employed to change the position of the bearings on said bar.

Preferably movement is imparted to the conveyor 34 by the driving mechanism for the forming machine, said driving mechanism including the vertical shaft and pinion 29 and 30 respectively, and the ring gear 28. This driving mechanism is connected to the vertical shaft 61 at the discharge end of the main conveyor and includes a differential timer 66 and safety device 67. The specific construction involved includes a shaft 68 operatively connected to the vertical drive shaft 30 (Fig. 22) and connected through bevel gears 69 to a shaft 70 which in turn has driving connection through bevel gears 71 to a shaft 72. This shaft 72 (Figs. 3, 22, and 24) is directly connected to the differential timer 66 and through the latter to a shaft 73 extending substantially the full length of the bottle handling machine. This differential timer 66 (Figs. 3 and 24) may well be of conventional form and include a housing 74 for a gearing 75 and a worm gear 76 suitably connected to the housing and adapted to be moved about the axis of the shaft 73. Such movement adjusts the angular position of the shaft 73 relative to the shaft 72 and thereby changes the timed relation of the forming machine and conveyor operations. Manual adjustment of the timer is obtained by means of a worm 77 meshing with the worm gear 76 and mounted upon the inner end of a shaft 78 which at its outer end is connected to a hand wheel 79 or its equivalent.

A worm 80 is secured to the opposite end of the shaft 73 and runs in mesh with a worm wheel 81, the latter mounted upon the lower end of a shaft 82 which is journaled in bearings 83 in a gear housing 84. A sprocket 85 secured to the upper end of said shaft 82 is connected through a sprocket chain 86 to a sprocket 87. This sprocket 87 is carried by a hub 88 which is rotatably mounted upon the lower part of the vertical shaft 61. A chain tightener in the form of a sprocket 86$^a$, pivoted arm 86$^b$, and a coil spring 86$^c$, operates to take up slack in the sprocket chain 86.

Figure 5:
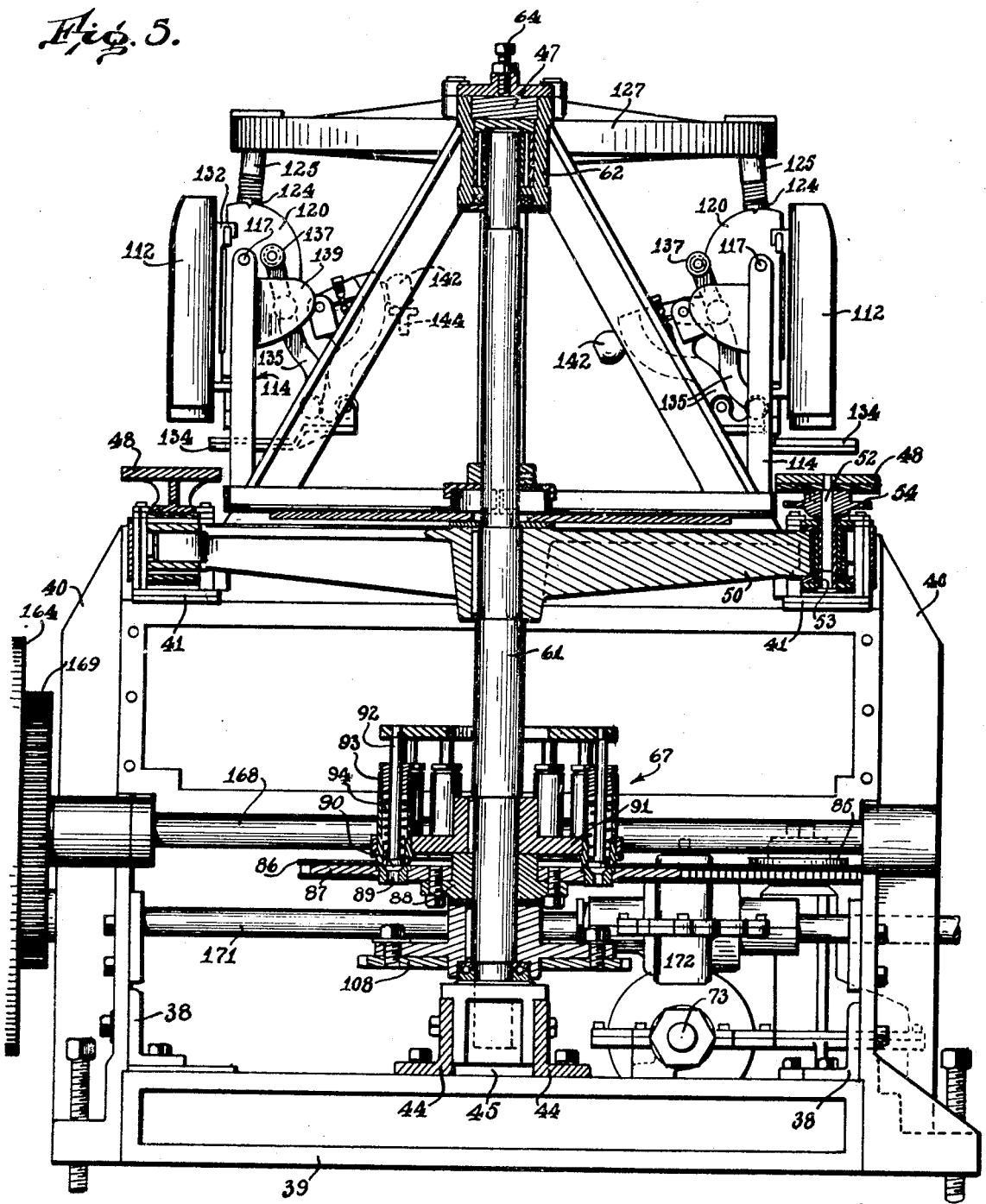
Fig. 5 is a vertical transverse sectional view taken substantially along the line V—V of Fig. 1.
Figure 20:
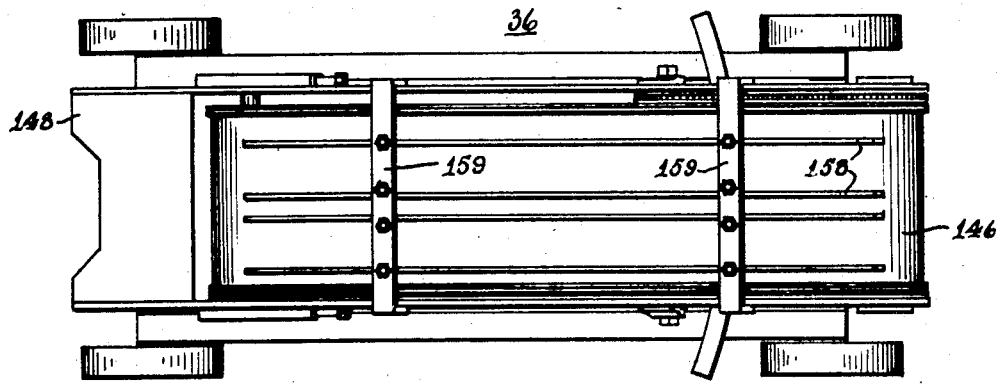
Fig. 20 is a detail plan view of the conveyor to which bottles are initially delivered by the forming machine.
Figure 21:
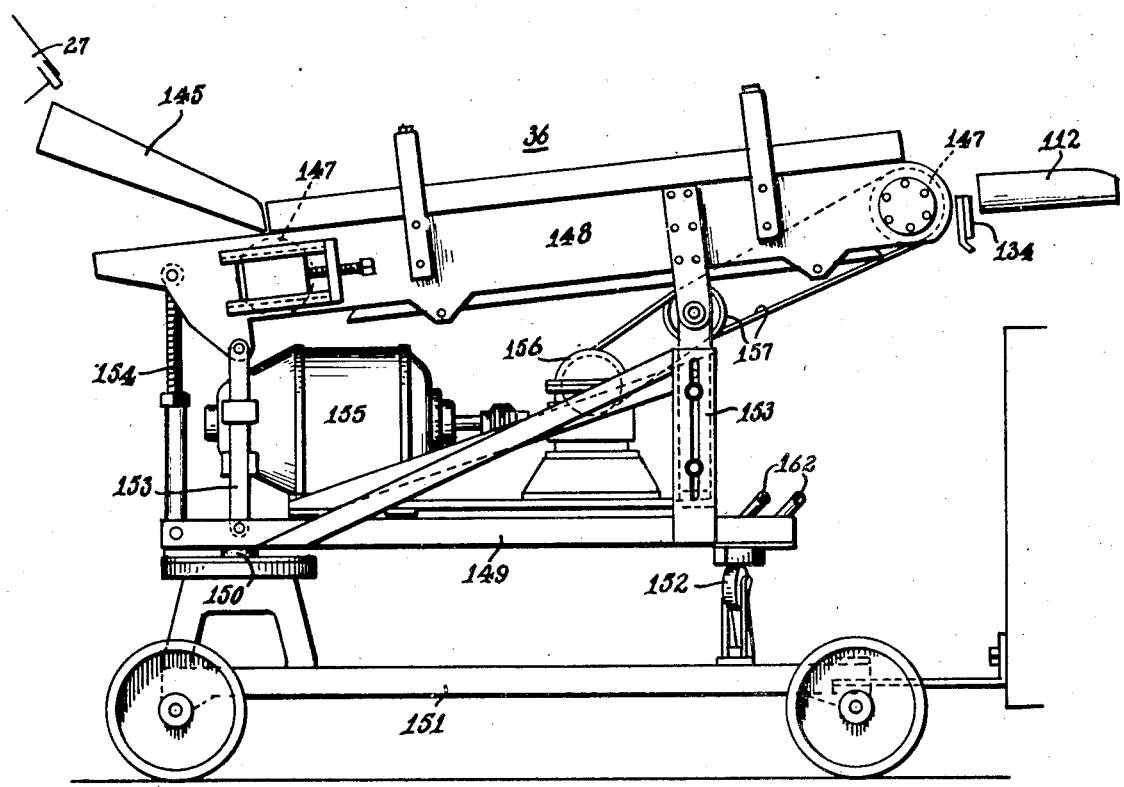
Fig. 21 is a side elevational view of the apparatus shown in Fig. 20.

As will be noted in Fig. 5 this sprocket 87 constitutes a part of the safety device 67 which automatically breaks connection between the driving mechanism and the conveyor arrangements above said device in the event the conveyor becomes jammed. This safety device includes an annular series of upwardly facing recesses 89 in the sprocket 87 normally in register with and operatively connected to an annular series of spring pressed detents 90, the latter suitably mounted in a carrier 91 which is secured to the shaft 61 for rotation therewith. Each of these detents includes a vertical pin 92 or plunger, arranged within a sleeve 93, and a coil spring 94 disposed within the sleeve and encircling the pin. The spring exerts a constant downward pressure on the pin and is designed to yieldingly hold the lower end thereof in one of the recesses 89. Preferably, the number of these detents is identical to the number of disks 48 which would constitute a circle about the periphery of the sprocket 50. Moreover, these detents and the disks are radially aligned and as a result, the timed relation between the various operations will not be affected by a momentary break in the driving connection due to operation of the safety device.

Figure 2:
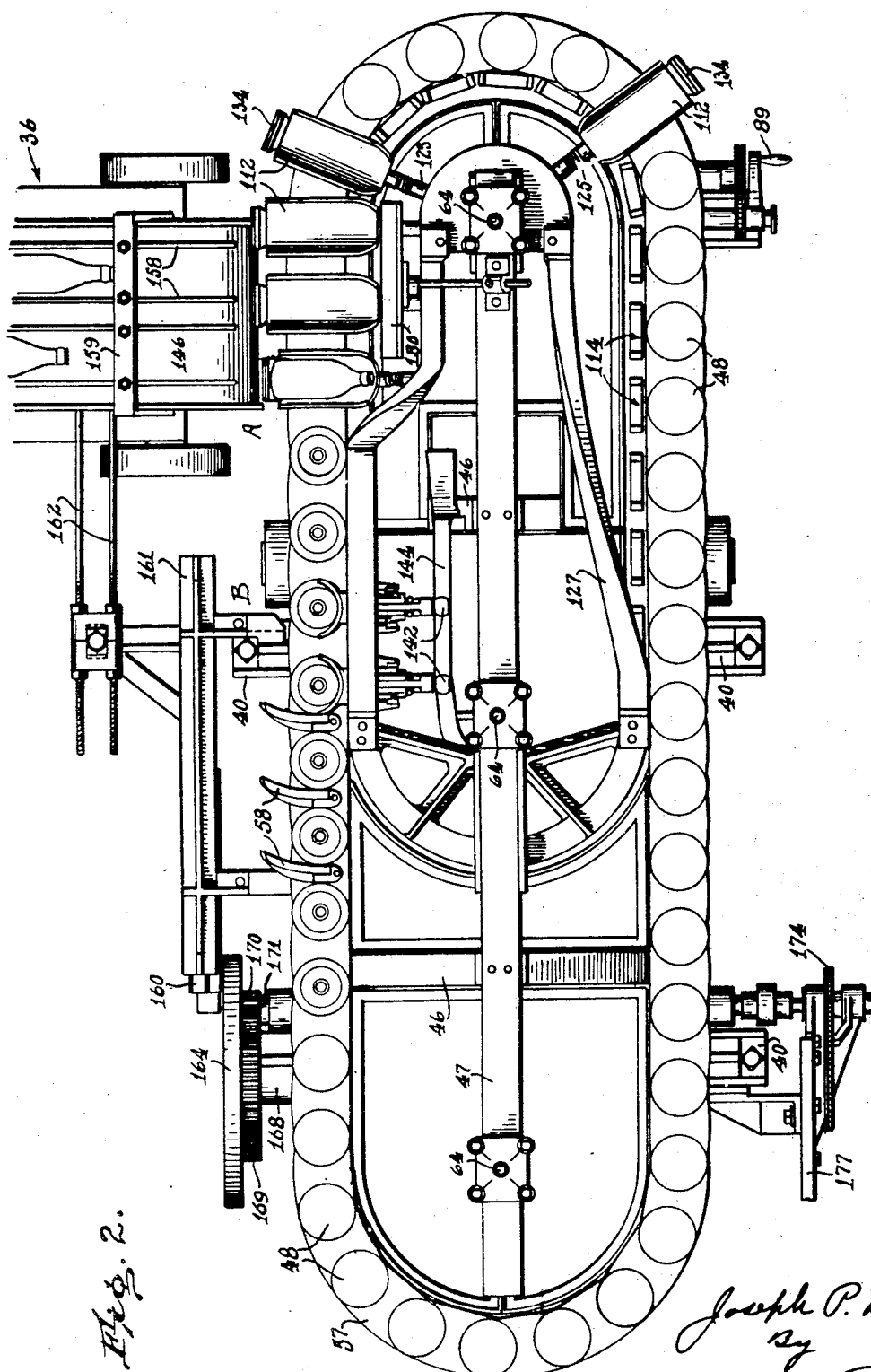
Fig. 2 is a top plan view.
Figure 3:
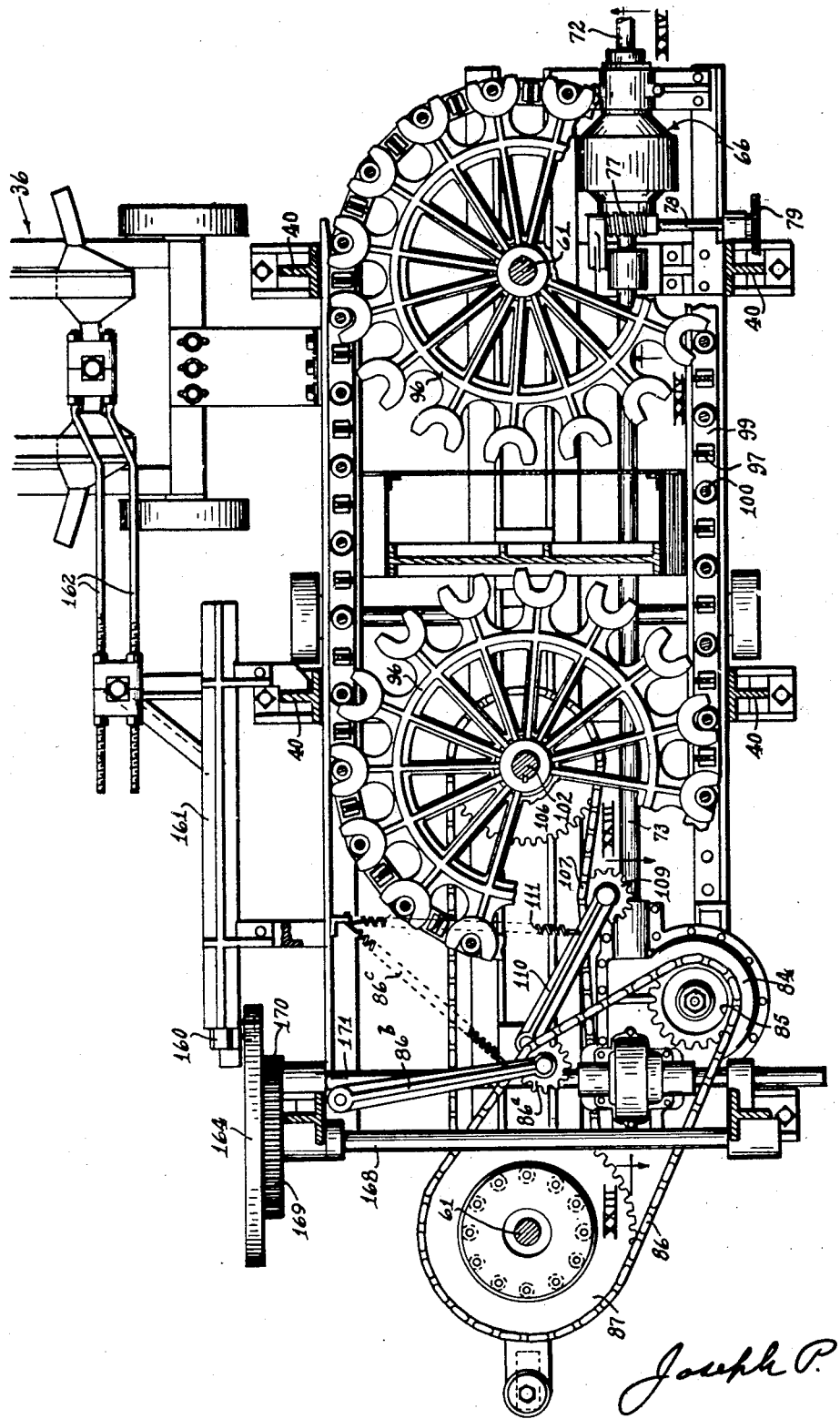
Fig. 3 is a sectional plan view.

Articles such as bottles and jars are placed upright upon the main conveyor 34 by means of the series of uprighting cradle units 35 referred to heretofore. These cradle units move in a closed horizontal path over a portion of the main conveyor 34 past charging and discharging positions A and B respectively, as shown in Fig. 2. An endless carrier 95 (Figs. 3, 4, 9, 10, 25) trained over sprockets 96, supports the series of cradle units. The carrier consists of a plurality of frames individual to the cradle units, each frame being substantially I-shape and consisting of an upstanding bar 97 rising from a horizontal base plate 98 and connected at its upper end to a horizontal head plate 99 which is directly connected to one of the cradle units as will be apparent hereinafter. These frames are pivoted together by vertical hinge pins 100 (Figs. 3, 9). Preferably, the base member 98 of each frame is provided with a roller 101 on its lower side for engagement with a track 42 which extends throughout a major portion of the path of travel of these frames. The sprockets over which the carrier is trained include a pair mounted in vertical spaced relation upon the shaft 61 at the receiving end of the machine and a second pair mounted upon a vertical shaft 102 substantially midway between the shafts 61. This shaft 102 is journaled at its ends in bearings 103 and substantially midway its length in a bearing 104. The end bearings are adjustable by means of an adjusting screw 105 (Fig. 4) and the intermediate bearing 104 being slidingly mounted in a way 104$^a$, automatically changes its position with adjustment of the other bearings. Motion is imparted to the carrier 95 by rotating the intermediate shaft 102, this being accomplished through a construction including a sprocket 106 keyed to the lower end of said shaft and a sprocket chain 107 trained over the sprocket 106 and another sprocket 108 which is keyed to the lower end of the vertical shaft 61 at the delivery end of the machine. A chain tightener including an idler sprocket 109, a pivoted arm 110 carrying the idler, and a coil spring 111 connected to said arm, operate to take up slack in the sprocket chain 107.

Each of the cradle units referred to above includes a cradle 112 or trough mounted above one of the frames making up the carrier 95, said cradle being arranged for oscillative movement of approximately 90° about a horizontal axis with the result that while moving through the charging zone, it will be disposed horizontally to receive bottles delivered thereto in a cumbent position and in the discharging zone will occupy a substantially vertical position preparatory to placing bottles or the like articles upright upon the main conveyor 34. These cradles may be removed and replaced with ease. The construction involved is substantially as follows:

A frame 113 including a substantially U-shaped upper section 114, rises from one of the carrier frames 95, said upper section having separable connection to the lower section. Between upright arms 115 of the upper frame section 114 and at the upper ends thereof, a cradle holder 116 (Figs. 13 and 18) is mounted upon a horizontal hinge pin 117. This holder 116 consists of a central body portion 118, and a substantially T-shaped downward extension forming a stop 119 for limiting swinging movement of the holder 116 in one direction by engaging the upright arms of the frame section 114. A pair of parallel vertical plates 120 at the upper end of the body portion 118 are formed with horizontally aligned hinge pin openings 121 and carry a pair of opposed horizontal ears 122. The plates 120 have curved marginal portions concentric with the hinge pin openings 121 and are formed with notches 123 designed to receive a spring pressed detent 124 carried by an arm 125. A cam roller 126 at the outer end of the arm 125 together with a cam 127 regulate and control the swinging movement of the cradle holder. At the lower end of the plates 120 a pair of arms 128 are formed, said arms having a pair of horizontal hinge pin openings 129 therein. The body portion 118 includes a pair of spring pressed detents 130 (Figs. 13, 14, and 16) which together with the ears 122 referred to above, separably connect the holder 116 and cradle 112. The cradle 112 (Fig. 17) includes a base member 131 provided on its upper end with hooks 132 or fingers which take over the ears 122 on the holder and at the lower end with a pair of notched arms 133 adapted for engagement with the detents 130. A bottom plate 134 (Fig. 16) is connected through parallel links 135 and hinge pins 136 to the arms 128. The forward pair of links have their upper ends extended above the hinge pins and provided with rollers 137 which at times run in cams 138 formed in plates 139 attached to the upper frame section 114. Through this arrangement the relation between the bottom plate 134 and cradles 112 is to a degree controlled. A coil spring 140 connects the single back link and the holder 116. An arm 141 which carries a cam roll 142 is pivoted to the back hinge pin 136 and connected through spring devices 143 to said back link 135. This construction provides a safety device which, in the event of jamming of parts of the mechanism, will permit the arm 141 to move upwardly under influence of a cam 144 independently of the other mechanism.

The loading conveyor 36 (Figs. 2, 3, 20, 21, and 22) is arranged between an inclined chute 145 at the article discharging stations of the forming machine and the loading station A of the main conveyor 34. This loading conveyor in its illustrated form is adapted to handle bottles or similar articles formed in double cavity molds and is operated so that its delivery end travels in register with successive pairs of cradles 112 during actual transferring of the articles from said loading conveyor to the cradles. Thus in effect the cradles form extensions of the loading conveyor momentarily. The construction involved includes an endless conveyor belt 146 trained over pulleys 147 which are suitably mounted upon an inclined frame 148, said frame in turn being supported upon a horizontally oscillating carrier 149. This carrier is mounted for swinging movement about a vertical hinge pin 150 carried by the base 151 and at its other end rests upon a plurality of rollers 152. The frame 148 is connected to the oscillating carrier 149 through adjustable bars 153 and an adjusting screw 154, the latter providing means whereby the receiving end of the loading conveyor may be adjusted vertically to properly position it relative to the chute 145. The adjustable connection at the opposite end of the loading conveyor permits proper alignment of said conveyor and the cradles. A motor 155 operates through speed reduction gearing 156 and belts 157 or the like to impart continuous motion to the conveyor 146.

A plurality of guide rails 158 may be arranged above the conveyor 146 to define the paths of travel for the bottles or jars and maintain such spaced relation between them that they will not interfere with each other during their transfer from the machine to the main conveyor 34. These guide rails are suspended from cross bars 159 which in turn are suitably connected to the main frame 148.

Oscillation of the loading conveyor 36 so that the delivery end thereof moves in register with successive pairs of cradles at regular time intervals, is obtained by mechanism which is operatively connected to the driving mechanism for the main conveyor 34. The structure involved includes a horizontal slide 160 mounted in slideways 161 on the frame supporting the main conveyor, said slide being connected at one end through tie rods 162 to the oscillating carrier 149 and at its other through a cam roller 163 to a continuously rotating cam 164. Specifically the connection between the slide and cam (Fig. 15) includes a bar 165 extending lengthwise of the slide 160 and carrying said cam roller 163, said bar having a recess 166 therein, designed to provide a seat for a spring pressed detent 167 carried by the main part of the slide. This construction provides a safety feature as is obvious. The cam 164 is mounted upon one end of a horizontal shaft 168 which also carries a gear 169 running mesh with a pinion 170. This pinion is carried by a shaft 171 extending across the supporting frame for the main conveyor 34 to a gear box 172 (Figs. 5, 23), said gear box enclosing gears 173 one of which is keyed to the drive shaft 73. Thus it is evident that the driving connection between the various parts of the bottle handling apparatus provides means whereby any increase or decrease in the speed of operation of the forming machine correspondingly affects the speed of the article handling mechanism.

Motion is imparted to the carrying-in conveyor 32 by means of a sprocket chain 174 running over a pair of sprockets 175 one of which is suitably connected to the cross shaft 171 and a gear speed change mechanism 176, the latter being of conventional or any preferred form. These sprockets 175 are carried by an inclined frame 177, which also supports an idler sprocket 178 designed to take up slack in the sprocket chain.

In operation the bottles or jars produced on the forming machine 25 are discharged neck first from the finishing molds 27 into the inclined chute 145. From this chute the bottles move onto the loading conveyor which in turn delivers them to the cradles 112, such delivery being facilitated through movement of the outer end of the loading conveyor in register with the cradles a short distance. A bumper bar 180 (Figs. 1 and 13) limits movement of the bottles lengthwise in the cradles. By means of the cam 127 the cradles 112 are swung about hinge pins 117 in succession as they approach the uprighting zone B where they become vertically aligned with the disks 48 making up the main conveyor 34. The cam 144 then operates to retract the bottom plate 134 (Figs. 15, 16) with the result that the articles are placed upright upon the disks 48. These disks may or may not be rotated as they pass a blower 179 in a cooling zone. At a point beyond the cooling zone the bottles or other articles are pushed onto the cross conveyor 32 by means of the pushing fingers 58 and deflector 59. The pusher bar 33 (Fig. 22) may be operated by any well known mechanism to transfer groups of articles to the leer conveyor 31 at regular time intervals. As has been brought out heretofore, various adjustments are provided so that ideal and completely satisfactory operating conditions may be obtained and maintained.

Modifications may be resorted to within the spirit and scope of the appended claims.

What I claim is:

1. In combination, a horizontal conveyor mounted for movement past article receiving and discharging stations, a series of cradles moving in a closed horizontal path a part of which overlies said conveyor, means for imparting continuous movement to the conveyor and cradles, a loading conveyor arranged at the receiving station in position to deliver articles to the cradles, means for moving at least a part of said loading conveyor lengthwise of the path of travel of the cradles and substantially at the same speed as the latter during delivery of articles to the cradles, means for successively actuating the cradles to effect upright positioning of articles upon the horizontal conveyor, and means operating automatically for removing the articles from said horizontal conveyor at the discharging station.

2. In combination, a horizontal conveyor mounted for movement past article receiving and discharging stations, a series of cradles moving in a closed horizontal path a part of which overlies said conveyor, means for imparting continuous movement to the conveyor and cradles, a loading conveyor arranged at the receiving station in position to deliver articles to the cradles, means for moving at least a part of said loading conveyor lengthwise of the path of travel of the cradles and substantially at the same speed as the latter during delivery of articles to the cradles, means actuating the cradles in succession to move them from horizontal to vertical positions, means operating after the cradles are vertically positioned to effect dropping of the articles onto the horizontal conveyor, and means operating automatically to remove the articles from said conveyor at the discharging station.

3. In combination, a main conveyor mounted for movement in a closed horizontal path past article receiving and discharging stations, a series of tiltable cradles moving in a closed horizontal path a part of which overlies the path of travel of said main conveyor, means for imparting continuous movement to the conveyor and cradles, a loading conveyor extending substantially at right angles to the path of travel of said main conveyor and adapted to deliver articles to the cradles as they pass the receiving station, means actuating the loading conveyor so that it moves with the cradles a short distance during delivery of the articles to the latter, means for successively positioning the cradles to place articles upright upon the main conveyor, and automatic means for removing the articles from said conveyor at the discharging station.

4. In combination, a main conveyor moving continuously in a closed horizontal path past article receiving and discharging stations, a series of tiltable cradles moving in a closed path a part of which substantially overlies the path of the main conveyor, means for moving the cradles from a horizontal position at the receiving station to a vertical position substantially over the main conveyor at a point beyond said receiving station, means for then actuating the cradles one at a time to deposit articles upright upon the main conveyor, and means for removing the articles from said main conveyor at the discharging station.

5. In combination, a horizontal main conveyor, means for placing bottles upright upon said conveyor including an oscillating loading conveyor extending substantially at right angles to the direction of travel of the main conveyor and periodically discharging bottles in a cumbent position above the latter, uprighting devices receiving the bottles from the loading conveyor and operating to place them upright upon the main conveyor, means for imparting continuous movement to the main conveyor, means for oscillating the loading conveyor in timed relation to the main conveyor, and automatic means for removing bottles from said main conveyor at a discharging station.

6. In combination, a main conveyor comprising a series of bottle supporting disks, means for imparting continuous movment to the conveyor, a series of bottle uprighting devices traveling in a closed path, means for moving the uprighting devices from a substantially horizontal position to a vertical position over the main conveyor, automatic means arranged at one side of the main conveyor for delivering bottles neck first into said devices while the latter occupy a horizontal position, means actuating said devices after they have assumed a vertical position for depositing the bottles upright upon the disks, and automatic means for removing bottles from the main conveyor at a discharging position.

7. In combination, a horizontal main conveyor, a loading conveyor arranged at one side of the main conveyor and adapted to deliver bottles neck first in a cumbent position, a series of tiltable bottle uprighting devices to which said loading conveyor delivers the bottles, means for moving said devices from substantially horizontal to vertical positions over the main conveyor, means for actuating said devices to transfer bottles from the holding influence thereof to upright positions on the main conveyor, means for moving said conveyor and uprighting devices in synchronism, and means for moving the loading conveyor so that its delivery end travels with the uprighting device during the period of delivery of bottles to the latter.

8. In combination, a horizontal main conveyor comprising a longitudinal series of bottle supporting disks mounted for movement in a closed horizontal path, a series of tiltable bottle uprighting cradles mounted for movement in a closed horizontal path in part overlying the path of the main conveyor and adapted at times to travel in register with said disks, means for tilting the cradles to thereby alternately place them in horizontal and vertical positions, a loading conveyor arranged at one side of the series of cradles and adapted to deliver bottles neck first and in cumbent position to the cradles while the latter are horizontally disposed, means for transferring bottles from the cradles while in vertical position to the disks, and means for effecting synchronized movement of the conveyors and cradles.

9. In combination, a horizontal main conveyor, a loading conveyor arranged at one side of said main conveyor, means for oscillating said loading conveyor about a vertical axis causing its delivery end to travel with the main conveyor a predetermined distance at regular time intervals, a series of bottle uprighting devices mounted for movement in a closed path in part overlying the path of the main conveyor and in proximity to the delivery end of said loading conveyor, means whereby the uprighting devices are moved from horizontal to vertical positions after receiving bottles from the loading conveyor, and means for then transferring bottles from the uprighting devices to the main conveyor.

10. In combination, an endless main conveyor mounted for movement in a closed horizontal path, means for imparting continuous movement to the conveyor, a series of tiltable cradles mounted for movement in a closed horizontal path, means for tilting the cradles whereby they are substantially horizontal at a bottle receiving position and vertical at a delivery position, a loading conveyor for delivering bottles neck first to the cradles at the receiving position, means for effecting limited movement of the loading conveyor in the direction of travel of said cradles, and means whereby bottles are delivered to the main conveyor from said cradles while the latter are in vertical position.

11. In combination, a horizontal main conveyor, a series of article uprighting cradles arranged in a plane above said main conveyor and mounted for movement in a path in part overlying at least a portion of the main conveyor, means for delivering articles in a cumbent position to the cradles, and means for then actuating the cradles while traveling with the conveyor to effect removal of the articles therefrom and upright positioning of the articles on the main conveyor.

12. In combination, a horizontal main conveyor, a series of article uprighting cradles arranged in a plane above said main conveyor and mounted for movement in a path in part overlying at least a portion of the main conveyor, means for delivering articles in a cumbent position to the cradles, means for then actuating the cradles to effect removal of the articles therefrom and upright positioning of the articles on the main conveyor, a carrying-in conveyor to which articles are transferred from the main conveyor for delivery to a leer, means for imparting continuous movement to the main conveyor, and means whereby movement of the main conveyor effects operation of the carrying-in conveyor and the means for placing articles in the cradles.

13. In combination, a horizontal main conveyor, a series of article uprighting cradles arranged in a plane above said main conveyor and mounted for movement in a path in part overlying at least a portion of the main conveyor, an oscillating loading conveyor arranged to deliver bottles to the cradles, means for then actuating the cradles to effect upright positioning on the main conveyor, and means for oscillating the loading conveyor and thereby causing its delivery end to travel in alignment with the cradles a predetermined distance.

14. Bottle uprighting mechanism including a cradle, a cradle holder pivoted for swinging movement about a horizontal axis, a bottom plate for the cradle adapted to support articles during a portion of the uprighting operation, means including parallel links connecting the bottom plate to said holder, means for swinging the cradle and holder between substantially horizontal and vertical positions, and means operable after substantially vertical positioning of the cradle and holder for retracting the bottom plate and thereby releasing articles from the supporting influence of the cradle and bottom plate.

15. In combination, a horizontal main conveyor movable past bottle receiving and discharging positions, means for imparting continuous movement to the conveyor, a series of bottle uprighting devices traveling in a closed path, means for moving said devices from a substantially horizontal position to a vertical position over said main conveyor, automatic means arranged at one side of the main conveyor and delivering bottles neck first into said devices while the latter occupy a horizontal position, and means actuating said devices after they have assumed a vertical position for depositing the bottles upright upon the main conveyor.

16. Bottle uprighting mechanism including a cradle holder pivoted for swinging movement about a horizontal axis, a cradle, means including spring detents for separably connecting the cradle and holder, a bottom plate adapted to support articles in the cradle during a portion of the uprighting operation, means for swinging the cradle and holder between substantially horizontal and vertical positions, and means operable after substantially vertical positioning of the cradle and holder for effecting removal of articles from the supporting influence of the cradle and bottom plate.

17. Bottle uprighting mechanism including a cradle holder pivoted for swinging movement about a horizontal axis, a cradle, means including spring detents for separably connecting the cradle and holder, a bottom plate adapted to support articles in the cradle during a portion of the uprighting operation, means including parallel links connecting the bottom plate to said holder, means for swinging the cradle and holder between substantially horizontal and vertical positions, and means operable after substantially vertical positioning of the cradle and holder for retracting the bottom plate and thereby releasing articles from the supporting influence of the cradle and bottom plate.

JOSEPH P. BENOIT.